United States Patent [19]

Thompson et al.

[11] 4,029,210
[45] June 14, 1977

[54] BOBBIN SPACER FOR CONVEYOR SYSTEM

[75] Inventors: Walter F. Thompson; Dennis M. Redo, both of Somerville, N.J.

[73] Assignee: General Cable Corporation, Greenwich, Conn.

[22] Filed: Sept. 10, 1975

[21] Appl. No.: 611,909

[52] U.S. Cl. .................................. 209/82; 209/73; 198/460

[51] Int. Cl.² .......................................... B07C 5/04

[58] Field of Search ......... 209/73, 80, 82, 111.7 R; 198/34, 191, DIG. 7, 459, 460, 491

[56] References Cited

UNITED STATES PATENTS

| | | | |
|---|---|---|---|
| 3,251,452 | 5/1966 | Conway et al. | 198/34 |
| 3,334,740 | 8/1967 | McCollough et al. | 209/111.7 R |
| 3,506,106 | 4/1970 | Brouwer et al. | 198/191 X |
| 3,608,293 | 9/1971 | Brouwer | 57/54 X |
| 3,627,107 | 12/1971 | DiMauro | 198/34 |
| 3,774,748 | 12/1973 | Dederer et al. | 198/460 X |
| 3,866,740 | 2/1975 | Greathead | 198/460 |

Primary Examiner—Robert B. Reeves
Assistant Examiner—Joseph J. Rolla
Attorney, Agent, or Firm—Roy C. Hopgood; John M. Calimafde; Eugene J. Kalil

[57] ABSTRACT

This invention conveys full and empty bobbins between different locations in a manufacturing facility for making communication cables. Most of the manual handling of the bobbins is eliminated by having a closed loop conveyor on to which bobbins are loaded and from which bobbins are ejected at selected locations; and the invention provides lift members for automatically spacing the bobbins on the conveyor at a location between a loading station and the next ejector. The spacing is accomplished while the conveyor is in continuous motion.

15 Claims, 6 Drawing Figures

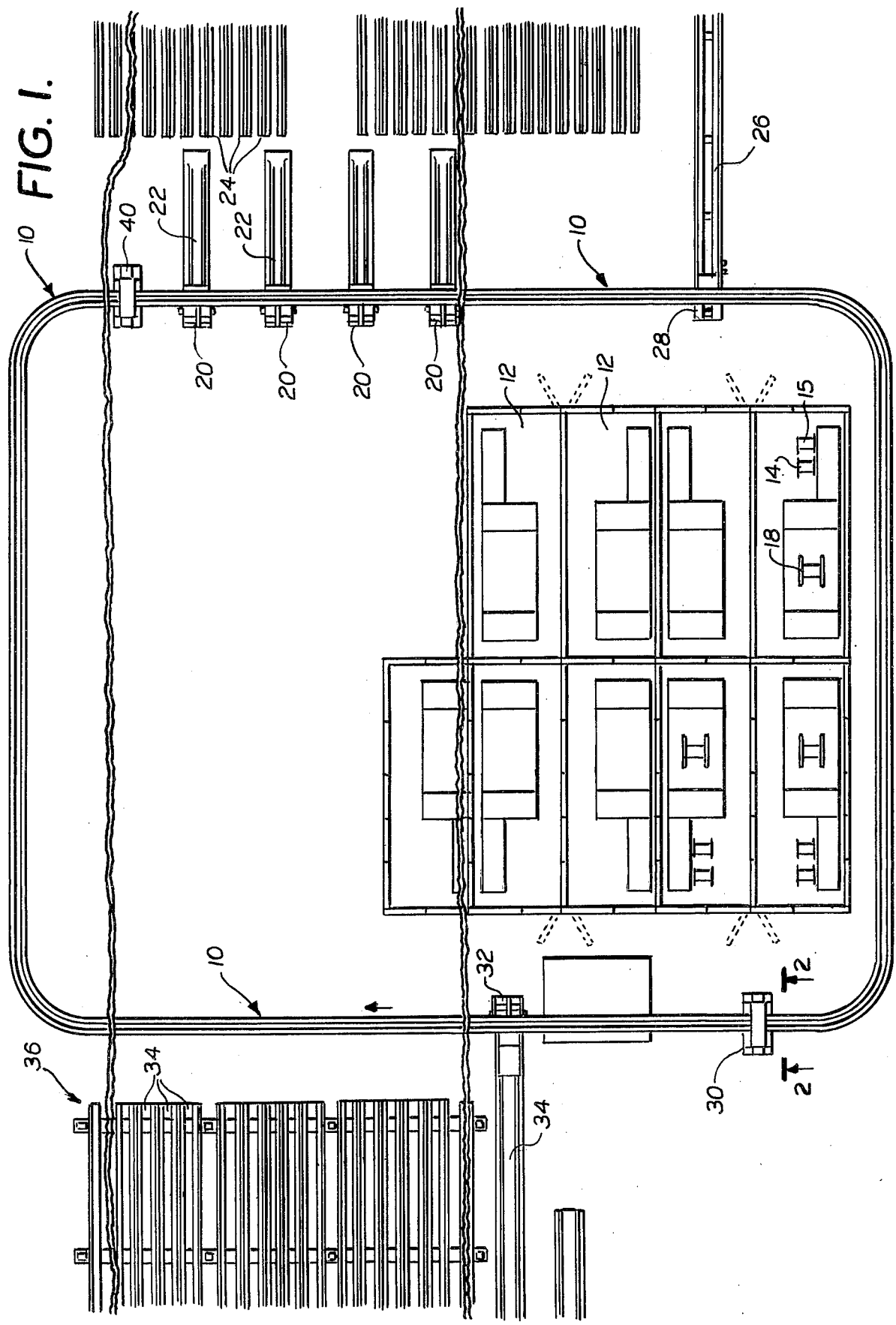

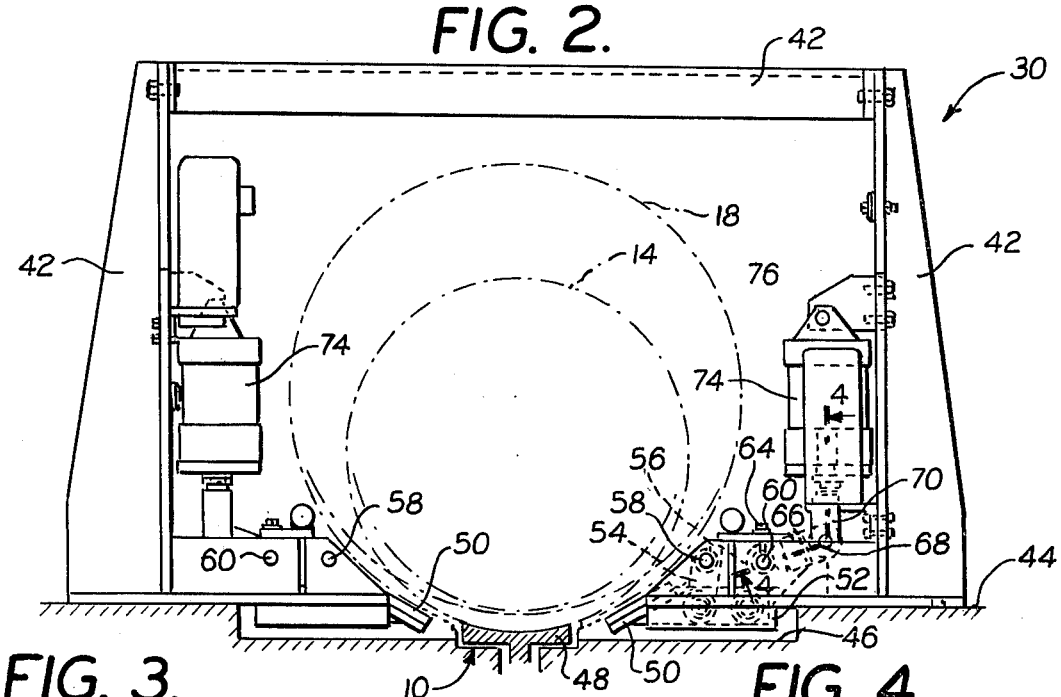
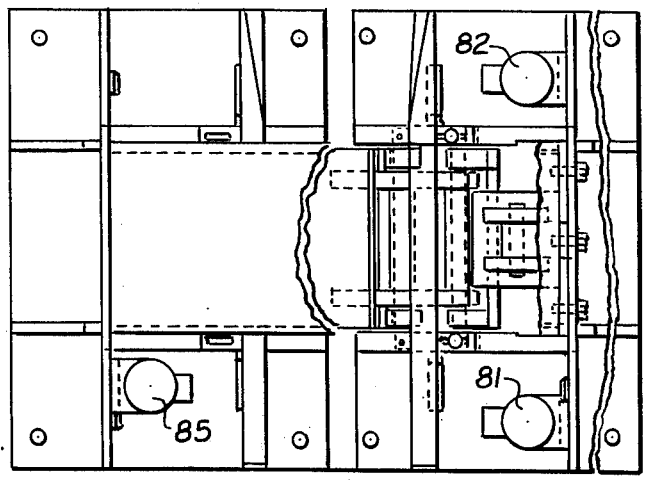
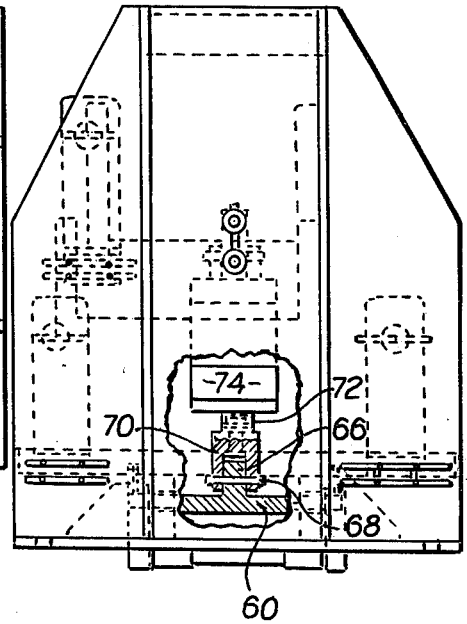
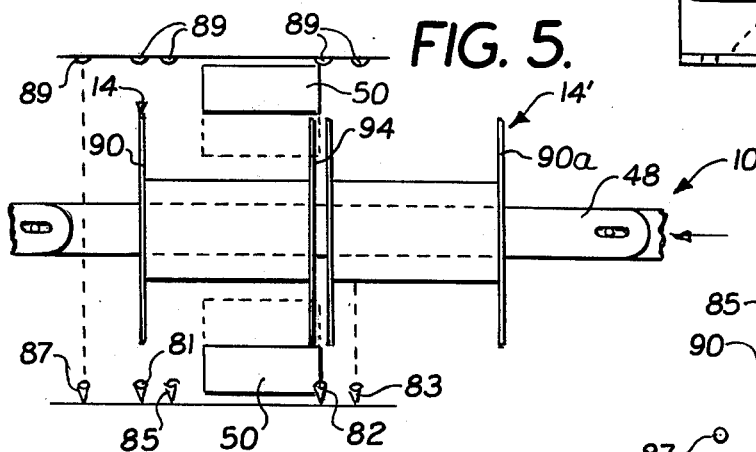
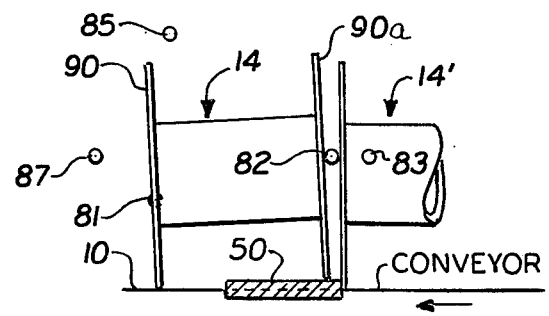

BOBBIN SPACER FOR CONVEYOR SYSTEM

BACKGROUND AND SUMMARY OF THE INVENTION

This invention is for use in plants manufacturing communication cables. The invention comprises a closed loop conveyor, preferably a floor conveyor to and from which bobbins can be rolled from the floor of the plant. The conveyor can be used for moving bobbins wrapped with individual wires, having various colors according to the desired color coding for the final cable, from an inventory storage rack to pairing machines.

At the pairing machines, the bobbins having individual wires thereon are placed on the pay-offs of pairing machines which take the individual wires and twist them into pairs having a desired angle of lay; and the twisted wires are wound on larger bobbins which are later conveyed to the pay-offs of a cabling machine.

The conveyor of this invention is provided with means for automatically loading empty bobbins from the cabling machine. The conveyor is manually loaded with empty bobbins from the pairing machine locations and automatically ejects these empty bobbins to a gravity conveyor by which they are returned to a part of the plant for reuse.

The closed loop conveyor is manually loaded with full pair bobbins and has means for ejecting these bobbins for accumulation at locations where they are moved by a crane or other means to paired bobbin storage racks from which any desired group of color coded pairs can be called for by the cabling machine.

The ejectors require a certain minimum space between successive bobbins. Time is saved and reliability is increased by not relying upon the manual loading to provide the necessary spacing between bobbins which are placed on the conveyor. A spacer is provided at a location between each conveyor loading station and the next ejector station.

The spacer automatically recognizes the size of the bobbin and automatically detects the necessity of increasing the spacing between bobbins, when there is such a necessity. This spacing is accomplished by simple and reliable means without stopping the conveyor and without removing the bobbin from the conveyor.

Electronic detecting means are used, such as photocells, for recognizing the size of the bobbins, the necessity for increasing the spacing and for controlling the mechanical elements that actually effect the increase in spacing.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic plan view showing a closed loop conveyor equipped with the loading, ejection and spacer means of this invention;

FIG. 2 is a greatly enlarged sectional view taken on the line 2—2 of FIG. 1 and showing one of the spacer stations in elevation:

FIG. 3 is a fragmentary top plan view of the construction shown in FIG. 2;

FIG. 4 is a side elevation of the spacer station shown in FIG. 2; and

FIG. 5 is a diagrammatic top plan view illustrating the way in which the control apparatus detects the necessity for spacing successive bobbins on the conveyor and for determining when sufficient spacing has been provided.

FIG. 6 shows the manner in which a leading bobbin is spaced by the lift members.

DESCRIPTION OF PREFERRED EMBODIMENT

FIG. 1 shows a loop (endless) conveyor 10 which travels around all sides of a group of pairing stations 12. These pairing stations include machines which hold two bobbins 14 and 15 which usually have different colored insulation. Insulated conductors are taken from the bobbins 14 and 15 and twisted according to a predetermined lay by pairing apparatus 16 in which the twisted pair is wound on a paired bobbin 18.

Since the bobbin 18 holds twice as much wire as either of the bobbins 14 and 15, the bobbin 18 is of larger diameter than the bobbins 14 and 15. When the bobbin 18 is fully wound it is placed on the conveyor 10 and travels clockwise with the conveyor 10 until it reaches a location where it is automatically ejected from the conveyor.

There are ejectors 20 located at four ejector stations spaced along the length of the conveyor 10. These ejectors 20 are merely representative of a plurality of ejectors, each of which can be operated to push full paired bobbins off the injector and on to a pairing conveyor chute 22 from which paired bobbins are transferred to bobbin tracks in compartments 24 of a paired bobbin storage rack. Paired bobbins with the same color coding are stored in the same compartment, or stack of compartments, of the rack 24 until called for by use on a cabling machine located beyond the rack 24 and not shown in FIG. 1.

When the paired bobbins are used at the cabling machine, they are returned empty by placing them on a return conveyor 26 which consists of a downwardly sloping track along which the empty bobbins roll to a loading station 28 at which successive bobbins roll on to the conveyor 10.

The empty bobbins travel with the conveyor 10 from the loading station 28 through a bobbin separator 30 which properly spaces the bobbins lengthwise of the conveyor for cooperation with an ejector 32 located some distance beyond the separator 30 and in the direction in which the conveyor 10 travels.

The spacer 30 will be described in more detail in connection with FIGS. 2 5; but for the present it is sufficient to understand that the spacer 30 first determines which bobbins are too close together for proper cooperation with the ejector 36. The separator 30 then operates automatically to increase the spacing between successive bobbins, which are too close, so that all of the bobbins are at a predetermined minimum distance from one another before they reach the ejector 32. The ejector 32 pushes empty bobbins from the conveyor on to a return conveyor 34 which has a sloping track along which the bobbins roll from the conveyor 10 and toward the left in FIG. 1 to other transport apparatus which eventually carries the empty bobbins back to the portion of the plant where they can be reused.

The full bobbins, each of which contains a conductor of a certain color insulation, come from inventory storage rack compartments 34 of an inventory storage rack 36; and individual bobbins from this storage rack 34 can be placed on the conveyor 10 for delivery to the pairing stations 12.

The ejector 32 distinguishes between the small bobbins 14 and 15 and the larger paired bobbins 18 and ejects only the small empty bobbins to the conveyor track 34. No bobbins are placed on the conveyor 10 between the spacer 30 and the ejector 32 because it is necessary that the spacing established by the spacer 30 be maintained until after the bobbins have passed the ejector 32.

If the conveyor 10 is used to convey full small loaded bobbins from the racks 34 to the pairing stations 12, these small bobbins can be placed on the conveyor 10 beyond the ejector 32 and they pass another spacer 40.

The spacer 40 is of similar construction to the spacer 30 and performs the same function; that is, it determines whether there are any bobbins on the conveyor with less than the predetermined spacing required for reliable operation of the ejectors 20; and when there is a lack of space between the bobbins, the spacer 40 operates to establish the predetermined minimum spacing desired for operation of the ejectors 20.

The fully wound small bobbins can be removed manually from the conveyor 10 at locations where they pass closest to the various pairing stations 12 at which they are to be used. FIG. 1 shows no ejectors for supplying these small, fully wound bobbins to the pairing stations 12, but it will be understood that they can be ejected and delivered in a manner similar to the ejectors 20 and 32 which are merely representative of ejectors for removing pre-selected bobbins from the conveyor 10 at locations where the bobbins are to be used or returned empty for rewinding.

FIG. 2 shows the spacer 30 which extends over the conveyor 10 and on both sides of the conveyor. The spacer 10 is shown with a main frame 42 which is attached to and rigidly supported by a floor 44 of the plant in which the conveyor 10 is installed.

There is a depression 46 in the floor 44 and the conveyor 10 is a "floor conveyor" with individual sections 48 which have top surfaces sloping downward toward the center of the individual sections 48 so that bobbins 14 and 18 are held centered on the conveyor by gravity.

The conveyor sections 48 are connected to one another by articulated connections so that the conveyor can travel along both straight and curved paths as determined by guide means located in the floor 44. Such floor conveyors are well known and no illustration of the conveyor 10, other than the bobbin supporting sections 48, is necessary for a complete understanding of this invention.

The conveyor 10 is driven by one or more motors through such reduction gearing as may be necessary to obtain the desired conveyor speed and the speed is preferably controlled by controlling the motor speed or the mechanical advantage of the reduction gearing, all of which is well known in the conveyor field and which forms no part of the present invention.

On both sides of the conveyor 10, there are shoes 50 which are normally in a position below and out of the path of the bobbins 14 and 18 as these bobbins are moved by the conveyor 10 through the spacer 30.

Each shoe 50 is rigidly secured to a support 52 and this support 52 is pivotally connected with the lower ends of generally parallel links 54 and 56. These links 54 and 56 are pivotally supported by shafts 58 and 60 which extend through the upper ends of the links 54 and 56 and then through portions of the fixed frame 42.

The support 52, links 54 and 56, and the portion of the fixed frame 42 between the pivots 58 and 60 form, in effect, a pantograph which maintains the shoe 50 and the shoe support 52 in generally parallel positions as the links 54 and 56 swing clockwise and counter clockwise through a limited, downwardly extending angle, about the pivots 58 and 60.

When the links 54 and 56 swing clockwise about the pivots 58 and 60, the shoe 50 moves inward toward the conveyor 10 (toward the left in FIG. 2) and also moves upward as the lower ends of the links 54 and 56 swing upward. This shifts the shoes 50, at opposite sides of the conveyor 10, from the full line positions shown in FIG. 5 to the dotted line positions, FIG. 5 being a diagrammatic view looking downward on the conveyor 10 and the shoes 50.

Referring again to FIG. 2 it should be understood that the shoes have a substantial extent lengthwise of the direction of movement of the conveyor 10 and the shoes are supported at their opposite ends by links 54 and 56 similar to those shown and described in connection with FIG. 2. The pivot connections 58 and 60 are shafts that extend lengthwise and parallel to the shoe 50. The shaft 46 is rigidly connected to the link 56 by a set screw 64 so that the shaft 60 and link 56 move as a unit. A crank 66 extends from the shaft 60 to a pivot connection 68 with a yoke 70 at the lower end of a piston rod 72 of a cylinder and piston motor 74.

The motor 74, which is preferably hydraulic, is connected to the main frame 42 by a pivot connection 76. This permits the motor 74 to move angularly about the connection 76 to compensate for the arcuate movement of the pivot connection 68 as the crank 66 swings about the axis of the shaft 60.

The motor 74 is preferably a double acting motor but can be equipped with a spring for moving it in one direction, if desired.

The shoe operating mechanism thus far described, is for the right hand shoe 50 in FIG. 2. There is similar apparatus for moving the left hand shoe 50 and this apparatus is shown in less detail, but parts which are illustrated are indicated by the same reference characters as those for the right hand shoe since the constructions are the same.

The motors 74 are operated to raise and lower the shoes 50 by electronic actuated controls which are responsive to the passage of the bobbins along the conveyor and through the separator 30. There are many different kinds of controls that can be used for this purpose and the illustrated controls are photoelectric devices where the interruption of a light beam and certain groups of light beams selectively control the functioning of the motors 74 to raise and lower the shoes 50. The motors 74 are merely representative of actuators for the shoes 50 and it will be evident that solenoids or other devices could be substituted as equivalents.

The electronic control means operate circuits to open and close valves if the actuators are hydraulic and to open and close switches if the actuators are electric. Such controls are well known and no illustration of them is necessary for a complete understanding of this invention.

FIGS. 5 and 6 are diagrammatic views showing the controls. FIG. 5 is a top plan view and FIG. 6 is an elevation. There are five photocells 81, 82, 83, 85 and 87. Each of these cells projects a beam of light across the space above the conveyor 10 to a reflector 89. All of the reflectors 89 reflect the beam back to a light sensitive element of the respective photocells.

FIG. 6 shows the way in which a leading bobbin 14 on the conveyor 10 has its flange lifted from the conveyor by the shoes 50 when these shoes move upward. The upstream end of the shoe 50 acts as a stop to prevent a trailing bobbin 14' from moving with the conveyor 10.

The top surface of each shoe 50 is smooth and the coefficient of friction of the leading flange, designated by the reference character 90 in FIG. 6, is greater than the coefficient of friction of a trailing flange 90a on the shoe 50. Thus the lifting of the flange 90a from the conveyor does not prevent the bobbin 14 from continuing to move with the conveyor.

Since the trailing bobbin 14' is locked from further movement, and the conveyor slides under this now stationery bobbin 14', a space opens up between the leading bobbin 14 and the trailing bobbin 14'. When this space becomes equal to the predetermined minimum space required, the shoe 50 goes down and leaves the leading flange of the trailing bobbin 14' unobstructed so that the bobbin 14' will move as a unit with the conveyor.

Whenever a bobbin 14, moving along the conveyor, interrupts the light beam of the photocell 81, the shoe 50 will rise and lift the trailing flange 94 from the conveyor and block the trailing bobbin 14' from further movement unless both of the beams of the photocells 82 and 83 are uninterrupted. If both of the photocells 82 and 83 are receiving their reflected light, this means that there is a space between the bobbins 14 and 14' equal to the desired space for which the separator is designed. If the bobbin 14' is following the bobbin 14 by a distance less than the space between the photocells 82 and 83, then the light beam of the photocell 83 will be interrupted when the flange 90 of the leading bobbin 14 reaches the photocell 81 and the shoe 50 will rise and stop further motion of the trailing bobbin 14'.

There is another photocell 85 which serves the same purpose as the photocell 81, but which is located in such a position that the light beam is not interrupted unless a flange on the bobbin is high enough to reach the light beam of the photocell 85. The larger paired bobbins 18 are high enough to interrupt the light beam of the photocell 85. These different photocells 81 and 85 are necessary when the different size bobbins are of different width; and the photocell 81 and 85 must be adjusted lengthwise of the conveyor so that their distance from the photocell 82 in the direction of the conveyor movement, is equal to the width of the bobbin by which they are controlled.

When the forward flange 90 of the leading bobbin 14 obstructs the light beam from the photocell 87, the spacing between the bobbins has reached the desired value and the shoe actuators are controlled so as to lower the shoe 50.

It is necessary to prevent the trailing flange 90a from operating the shoe 50 when and if it interrupts the light beam of the photocell 85. Such actuation is prevented by having the interruption of the light beam or photocell 35 ineffective as long as the light beam 87 remains interrupted.

The light beam of the photocell 87 is located in a position where it is not only obstructed by passage of a flange but is also obstructed by passage of the drum portion of the bobbin and its light beam will, therefore remain interrupted until after the trailing flange 90a has passed beyond and to the downstream side of the light beam from the photocell 85.

No wiring diagram for the control circuits is shown in the drawing. The operation of the shoe actuators in response to the effect of the bobbins on the electronic controls can be accomplished in many ways and a wiring diagram can be constructed easily by anyone skilled in the art. The responses of the shoe actuators to the positions of the bobbins with respect to the electronic detectors is set forth in Table 1 below. A wiring diagram for the controls can be constructed from this table.

TABLE 1

| INTERRUPTED LIGHT BEAMS | MOVEMENT OF SHOE 50 |
| --- | --- |
| 81 | Stays down |
| 81 & 82 &/or 83 | Moves up |
| 87, 81 & 82 &/or 83 | Moves down |
| 81 & 85 | Stays down |
| 81, 85 & 82 &/or 83 | Moves up |
| 87 & 81 | Moves down |
| 81, 85 & 87 | Stays down |

The preferred embodiment of the invention has been illustrated and described, but changes and modifications can be made and some features can be used in different combinations without departing from the invention as defined in the claims.

What is claimed is:

1. A bobbin conveyor for a wire making plant including in combination an endless belt conveyor on which the flanges of flanged bobbins are placed at a loading location for transfer to another location, said conveyor being of a width less than the diameter of the flanges of the bobbins, bobbin spacing apparatus at a station between the loading location and the other location, said bobbin spacing apparatus comprising means for contacting the flange of a trailing bobbin that is closer to a leading bobbin than a predetermined minimum distance lengthwise of the conveyor to hold said trailing bobbin from moving with the conveyor belt and to thereby increase the spacing of successive bobbins from one another, said means being located on opposite sides of the conveyor in positions over which bobbin flanges, projecting beyond the sides of the conveyor, travel as they move with the conveyor, and motion transmitting apparatus for moving said means into and out of the path of the bobbin flanges.

2. The bobbin conveyor described in claim 1 characterized by the means for contacting the flange of a trailing bobbin including a stop that holds a trailing bobbin stationary on the conveyor while a leading bobbin travels with the conveyor.

3. The bobbin conveyor described in claim 1 characterized by the bobbin flanges resting on the conveyor with the longitudinal axis of each bobbin extending parallel to the direction of movement of the conveyor, the spacing means for contacting the flange of a bobbin being in position to effect operation of a lift when a rearward end of the lift is under the trailing flange of the leading bobbin that is not sufficiently spaced from a trailing bobbin, the rearward end of the lift, when actuated to lift the trailing flange of the forward bobbin, terminating ahead of the leading flange of the trailing bobbin so as to stop further movement of the leading flange of the trailing bobbin until the lift has been lowered.

4. The bobbin conveyor described in claim 1 characterized by the bobbins resting on the conveyor with the longitudinal axis of each bobbin extending parallel to the direction of movement of the conveyor, the conveyor having a transversely curved surface which is low at the middle thereof whereby bobbins on the conveyor are held transversely centered on the conveyor by gravity and the means for contacting a flange being a lift that includes two shoes, one beyond each side of the conveyor and under portions of the flanges but movable into a lowered position out of the path of the flanges of the bobbins, motor means for moving the shoes upwardly under a trailing flange of a bobbin in response to a signal from control means of detectors along the conveyor for determining spacing of the bobbins below said predetermined minimum.

5. The bobbin conveyor described in claim 1 characterized by the conveyor being a closed loop, floor conveyor, driving means that keep the conveyor in continuous motion, there being a plurality of loading stations including one loading station at which the flanges of pair bobbins are rolled to load the bobbins on the conveyor automatically from an auxiliary conveyor, other locations at which the flanges of smaller empty bobbins for individual insulated conductors are rolled to load on the conveyor for return of said empty bobbins to wire making machines, an auxiliary conveyor with an ejector at an ejector station and onto which auxiliary conveyor the ejectors transfer the smaller empty bobbins, other locations with ejection apparatus for ejecting full pair bobbins from the closed loop conveyor, and tracks for receiving the flanges of bobbins at the locations where the full pair bobbins are ejected for accumulation of full pair bobbins for transfer to storage racks.

6. The bobbin conveyor described in claim 1 characterized by the conveyor being a loop conveyor, an auxiliary conveyor that transfers empty paired bobbins from the region of a cabling machine back to the group conveyor, and automatic discharge means for loading the empty pair bobbins from the auxiliary conveyor to the loop conveyor.

7. The bobbin conveyor described in claim 1 characterized by detectors of the spacing apparatus at predetermined distances from one another along the length of the conveyor and responsive to the presence of successive bobbins with less than the predetermined spacing between them.

8. The bobbin conveyor described in claim 7 characterized by the detectors being electronic devices that sense the presence of successive bobbins that are spaced from one another by less than the minimum predetermined spacing.

9. The bobbin conveyor described in claim 8 characterized by the electronic detectors comprising photocells and reflectors at locations between which the bobbins pass, some of the photocells being spaced from one another by said predetermined distance and at locations where the absence of unobstructed open space across the conveyor behind each bobbin that passes the photocells operates the spacing apparatus.

10. The bobbin conveyor described in claim 1 characterized by means for moving the endless belt conveyor with continuous motion, an ejection station along a length of the conveyor at said other location, the spacing apparatus being coordinated with the ejection station to space successive bobbins along the conveyor by the distance necessary for operation of the ejection station.

11. The bobbin conveyor described in claim 10 characterized by the conveyor being constructed for continuous movement with bobbins of different size, different ejection stations for the different size of bobbin, the spacing apparatus along the conveyor having means for spacing all bobbins regardless of size, and detectors at each of the ejection stations for determining the size of the bobbin, the different ejection stations being operative only in response to signals detecting a size for which each ejector station is intended to operate.

12. The bobbin conveyor described in claim 11 characterized by a bobbin track along which flanges of the bobbins roll from the conveyor back toward the location in the plant where the bobbins were originally wound, one of the ejectors being located in position to eject empty bobbins from the loop conveyor to the bobbin track, and other tracks located at other locations along the loop conveyor, which other tracks are long enough to accumulate a plurality of paired bobbins, and another ejector at each of said other tracks for ejecting fully wound pair bobbins from the loop conveyor to said other tracks.

13. A bobbin conveyor for a wire making plant including in combination an endless belt conveyor on which the flanges of flanged bobbins are placed at a loading location for transfer to another location, bobbin spacing apparatus at a station between the loading location and the other location, said bobbin spacing apparatus comprising means for contacting the flange of a trailing bobbin that is closer to a leading bobbin than a predetermined minimum distance lengthwise of the conveyor to hold said trailing bobbin from moving with the conveyor belt and to thereby increase the spacing of successive bobbins from one another, characterized by the bobbins having flanges at opposite sides thereof, and the flanges of the bobbins resting on the conveyor with the longitudinal axis of the bobbins extending parallel to the direction of movement of the conveyor, the means for contacting with the bobbins including a lift that raises the rearward flange of a bobbin from contact with the conveyor and that moves into position to contact the flange of a following bobbin and to block movement of the following bobbin with the conveyor until the first bobbin has moved far enough with the conveyor to establish the minimum distance between the rearward flange of the first bobbin from the forward flange of the following bobbin.

14. The bobbin conveyor described in claim 13 characterized by the lift having a surface on which the trailing flange of a bobbin rests when said trailing flange is raised from the conveyor, said lift having a lower coefficient of friction than the conveyor so that the trailing flange of the bobbin slides along the lift and moves with the conveyor as the leading edge advances with said conveyor.

15. The bobbin conveyor described in claim 14 characterized by the conveyor having a transversely curved surface which is lower at the middle thereof whereby bobbins on the conveyor are held transversely centered on the conveyor by gravity, and the lift includes two shoes, one on each side of the center line of the conveyor, and means for operating the shoes through equal strokes to raise the bobbin without substantial deflection of the bobbin from its centered position on the conveyor.

* * * * *